United States Patent
Kim et al.

(10) Patent No.: US 12,074,308 B2
(45) Date of Patent: Aug. 27, 2024

(54) BINDER, AND ELECTRODE AND LITHIUM SECONDARY BATTERY COMPRISING SAME

(71) Applicant: LG CHEM, LTD., Seoul (KR)

(72) Inventors: Taek Gyoung Kim, Daejeon (KR); Joo Hyeong Lee, Daejeon (KR); Kyung Oh Kim, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1047 days.

(21) Appl. No.: 16/645,737

(22) PCT Filed: Sep. 27, 2018

(86) PCT No.: PCT/KR2018/011392
§ 371 (c)(1),
(2) Date: Mar. 9, 2020

(87) PCT Pub. No.: WO2019/078505
PCT Pub. Date: Apr. 25, 2019

(65) Prior Publication Data
US 2020/0220177 A1 Jul. 9, 2020

(30) Foreign Application Priority Data
Oct. 16, 2017 (KR) .......................... 10-2017-0133771

(51) Int. Cl.
*H01M 4/13* (2010.01)
*H01M 4/02* (2006.01)
(Continued)

(52) U.S. Cl.
CPC ............... *H01M 4/13* (2013.01); *H01M 4/38* (2013.01); *H01M 4/382* (2013.01); *H01M 4/622* (2013.01);
(Continued)

(58) Field of Classification Search
None
See application file for complete search history.

(56) References Cited

U.S. PATENT DOCUMENTS

2010/0133482 A1  6/2010  Abusleme et al.
2011/0318646 A1  12/2011  Babinec et al.
(Continued)

FOREIGN PATENT DOCUMENTS

CN  102412401 A  4/2012
CN  106463704 A  2/2017
(Continued)

OTHER PUBLICATIONS

Machine translation of JP 2003-268053 A (Year: 2003).*
(Continued)

*Primary Examiner* — Robert S Carrico
(74) *Attorney, Agent, or Firm* — Birch, Stewart, Kolasch & Birch, LLP

(57) ABSTRACT

A binder, an electrode and a lithium secondary battery comprising the same, wherein the binder includes a first block including a polymer containing functional groups substitutable with lithium ions and a second block. The second block may include a polymer containing oxygen atoms in the main chain. With such a binder, it is possible to prevent the agglomeration of the slurry for preparing the electrode, thereby preventing the occurrence of cracks on the surface of the electrode and improving the life characteristics of the lithium secondary battery.

4 Claims, 1 Drawing Sheet

Example 1

Example 2

Comparative Example 1

(51) Int. Cl.
  *H01M 4/38* (2006.01)
  *H01M 4/62* (2006.01)
  *H01M 10/052* (2010.01)

(52) U.S. Cl.
  CPC .... *H01M 10/052* (2013.01); *H01M 2004/028* (2013.01); *H01M 2300/0082* (2013.01)

(56) References Cited

U.S. PATENT DOCUMENTS

| 2012/0070737 | A1 | 3/2012 | Son et al. |
| 2015/0303516 | A1 | 10/2015 | Pratt |
| 2016/0172665 | A1 | 6/2016 | Zhou et al. |
| 2018/0026270 | A1* | 1/2018 | Bae ................ H01M 4/587 429/217 |

FOREIGN PATENT DOCUMENTS

| JP | 2003-268053 A | 9/2003 |
| JP | 2006-210208 A | 8/2006 |
| JP | 2010-525124 A | 7/2010 |
| JP | 2010-182548 A | 8/2010 |
| JP | 2012-64574 A | 3/2012 |
| JP | 2012-517519 A | 8/2012 |
| JP | 2014-110234 A | 6/2014 |
| JP | 2015-115109 A | 6/2015 |
| JP | 2017-517860 A | 6/2017 |
| KR | 10-2012-0029899 A | 3/2012 |
| KR | 10-2013-0005875 A | 1/2013 |
| KR | 10-2013-0093261 A | 8/2013 |
| KR | 10-1356393 B1 | 2/2014 |
| KR | 10-2016-0058274 A | 5/2016 |
| WO | WO 2012/029839 A1 | 3/2012 |
| WO | WO 2015/160381 A1 | 10/2015 |

OTHER PUBLICATIONS

Machine translation of JP 2006-210208 A (Year: 2006).*
Extended European Search Report dated Jul. 14, 2020 for Application No. 18868835.2.
Krieg et al., "Doal hydrophilic polymers based on (meth)acrylic acid and poly(ethyleneglycol)—synthesis and water uptake behavior", Polym. Chem., vol. 1, 2010, pp. 1669-1676.
Schmolke et al., "Poly(acrylic acid)-graft-poly(ethyleneglycol) preparation and adsorption on polyelectrolyte multilayers (PEMs) for custom-made antiadhesive surfaces", Phy. Status Solidi A, vol. 208, No. 6, 2011 (Published online May 11, 2011), pp. 1290-1300.
International Search Report (PCT/ISA/210) issued in PCT/KR2018/011392, dated Feb. 28, 2019.

* cited by examiner

【Figure 1】
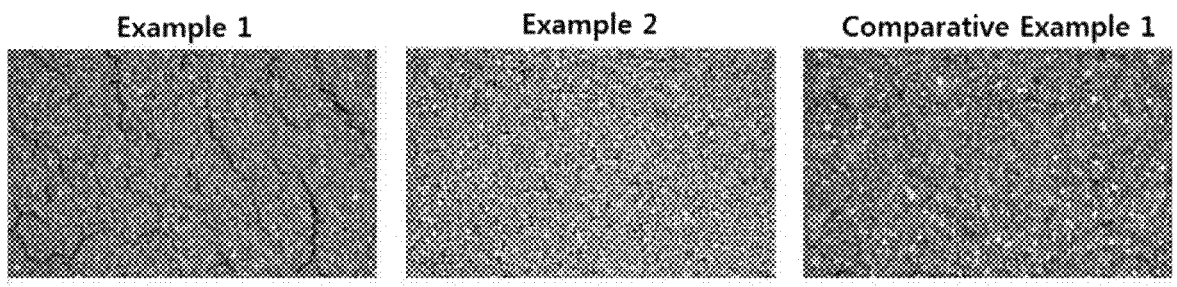
【Figure 2】
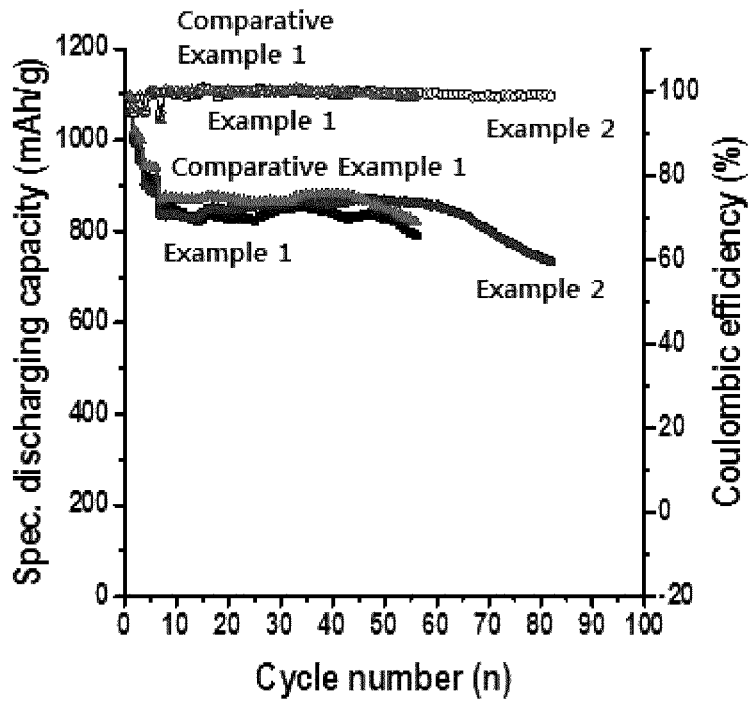

BINDER, AND ELECTRODE AND LITHIUM SECONDARY BATTERY COMPRISING SAME

TECHNICAL FIELD

The present application claims the benefit of Korean Patent Application No. 10-2017-0133771 filed on Oct. 16, 2017, the entire contents of which is incorporated herein by reference.

The present invention relates to a binder which can be used for an electrode of a lithium secondary battery, and an electrode and a lithium secondary battery comprising the same,

BACKGROUND ART

As the application area of secondary battery are expanding to the electric vehicles (EV) and the energy storage devices (ESS), lithium-ion secondary batteries are facing limitations due to their relatively low weight-to-energy storage density (~250 Wh/kg).

Among the next-generation secondary battery technologies that can achieve high energy density, the lithium-sulfur secondary battery is attracting attention due to its high commercial potential compared to other technologies.

The lithium-sulfur secondary battery means a battery system that uses sulfur as a positive electrode active material and lithium metal as a negative electrode active material.

In the lithium-sulfur secondary battery, when discharging the battery, the sulfur in the positive electrode is reduced by accepting electrons, and the lithium in the negative electrode is oxidized and thus ionized. The reduction reaction of sulfur is a process by which the sulfur-sulfur (S—S) bond accepts two electrons and is converted to the sulfur anion form. In that case, the lithium ion formed by oxidation is transferred to the positive electrode through the electrolyte to form a salt with ionized sulfur.

Sulfur before discharging has a cyclic $S_8$ structure, which is converted to lithium polysulfide ($LiS_x$) by a reduction reaction. The lithium polysulfide ($LiS_x$) is reduced stepwise and finally become lithium sulfide ($Li_2S$).

The theoretical energy density through such electrochemical reaction is 2,500 Wh/kg, which is 10 times that of lithium ion battery.

Despite the advantages of such lithium-sulfur secondary battery, there are many problems such as high solubility of the lithium polysulfide, low life and output characteristics, low electrical conductivity of sulfur and low stability due to the use of lithium metal.

As an example, since the lithium polysulfide ($LiS_x$) easily dissolves in the electrolyte solution, loss of active sulfur due to repetitive charging/discharging and thus degradation of cycle characteristics are considered to be the biggest problem to be solved in the lithium-sulfur secondary battery.

In order to solve the above problems, a technique for preparing an electrode using porous bodies and then impregnating sulfur between the porous bodies to inhibit solubility in the electrolyte, a technique of putting a substance capable of adsorbing the polysulfide into the electrode, a technique using the hydrophilic properties of the polysulfide or so forth have been proposed.

For example, it has been reported that charging/discharging life characteristics are improved by applying polyacrylic acid (PAA) as a water-based binder in the Li—S battery.

PAA has disadvantages of not only having a rigid tendency due to a glass transition temperature (Tg) of about 106° C., but also having a strong hydrogen bond between acrylic acids, thereby resulting in a very low flexibility of the electrode. These may also have some influence on the deterioration of the adhesive force of the electrode.

Accordingly, in order to improve the flexibility and adhesive force of the electrode, polyethylene oxide (PEO) may be used together. However, there is a disadvantage that the phase separation between PAA and PEO is seriously occurred and thus the processability is very weak.

It is necessary to carry out continuous studies on the lithium-sulfur secondary batteries having excellent electrochemical performance, while overcoming the problems of the prior art and preventing the leaching of lithium polysulfide ($LiS_x$) effectively.

PRIOR ART LITERATURE (Patent Literature 1) Japanese Laid-open Patent Publication No. 2010-525124, "vinylidene fluoride copolymer."

DISCLOSURE

Technical Problem

In order to solve the above problems, the inventors of the present invention have conducted various studies. As a result, it has been found that when a random copolymer form is prepared from polyacrylic acid (PAA) and polyethylene oxide (PEO) instead of simply blending them and then applied to the electrode as a binder, the phase separation of the binder does not occur and slurry agglomeration can be prevented, thereby reducing the surface roughness and crack of the electrode and improving the adhesive force of the electrode.

Therefore, it is an object of the present invention to provide a binder applicable to an electrode.

It is another object of the present invention to provide an electrode comprising the binder of the present invention.

It is yet another object of the present invention to provide a lithium secondary battery comprising the electrode of the present invention.

Technical Solution

In order to achieve the above objects, the present invention relates to a binder comprising a random copolymer including the first block and the second block wherein the first block includes a polymer containing functional groups substitutable with lithium ions.

The polymer containing the functional groups substitutable with lithium ions, which is included in the first block, may be at least one selected from the group consisting of polyacrylic acid (PAA), poly(vinyl sulfonic acid), poly(styrene sulfonate) and poly(vinyl phosphonic acid).

The functional groups substitutable with lithium ions, which is included in the first block, may be at least one selected from the group consisting of carboxylic acid, sulfonic acid, and phosphonic acid.

The first block may be the polymer in which the above functional groups are substituted with lithium ions.

The polymer containing oxygen atoms, which is included in the second block, may be at least one selected from the group consisting of polyethylene oxide (PEO), polypropylene oxide (PPO), and polyperfluoropropylene oxide (PPFPO).

The binder may comprise a random copolymer including polyacrylic acid (PAA) as the first block and polyethylene oxide (PEO) as the second block.

The binder may have a weight-average molecular weight of 5,000 to 4,000,000.

The random copolymer may comprise 50 to 90 wt. % of the first block and 10 to 50 wt. % of the second block.

The invention also relates to an electrode including an active layer comprising the binder, an electrode active material and an electrically conductive material.

The active layer may comprise 0.1 to 10 wt. % of the binder, 30 to 95 wt. % of the electrode active material and 2 to 60 wt. % of the electrically conductive material.

The present invention also relates to a lithium secondary battery including the electrode of the present invention.

The electrode may be a positive electrode.

Advantageous Effects

According to the binder of the present invention, as the PAA and PEO are included in the form of random copolymer, the binder in the form of random copolymer in the slurry for forming the active layer of the electrode can be evenly dispersed in comparison with the binder of the simple mixed form, and as a result, the active material and the electrically conductive material are sufficiently wetted in the slurry, and thus a slurry with good flowability can be realized even when the amount of water used for slurry preparation is small. That is, PAA and PEO form a random copolymer, specifically, a copolymer in which AA (acrylic acid) blocks and blocks branched with PEO are randomly constructed, and as a result, it is possible to prevent the occurrence of phase separation of the binder, thereby increasing the solid content of the slurry for forming the active layer of the electrode.

Also, as the solid content of the slurry is increased due to the morphological characteristics of the binder, the surface roughness and cracks of the electrode can be reduced, and thus the adhesive force of the electrode can be improved.

Due to the characteristics of the binder as described above, when applied to the lithium secondary battery, particularly the lithium-sulfur battery, the charging/discharging characteristics and life characteristics of the battery can be improved.

DESCRIPTION OF DRAWINGS

FIG. 1 is an optical microscope photograph of the surfaces of the positive electrodes prepared in Examples 1 and 2 and Comparative Example 1, respectively.

FIG. 2 is a graph showing the results of the charging/discharging test for the lithium-sulfur batteries manufactured using the binders of Examples 1 and 2 and Comparative Example 1, respectively.

BEST MODE

Hereinafter, the present invention will be described in detail in order to facilitate understanding of the present invention.

The terms and words used in the present specification and claims should not be construed as limited to ordinary or dictionary terms, and should be construed in a sense and concept consistent with the technical idea of the present invention, based on the principle that the inventor can properly define the concept of a term to describe his invention in the best way possible.

Binder

The present invention relates to a binder which can be used for preparing an electrode, and particularly relates to a binder which can be applied to a positive electrode of a lithium-sulfur battery to improve the charging/discharging and life characteristics of the battery.

The present invention provides a binder in the form of random copolymer comprising the first block and the second block, wherein the first block may comprise a polymer containing functional groups substitutable with lithium ions, and the second block may comprise a polymer containing oxygen atoms. Specifically, the binder in the form of random copolymer may be a copolymer in which AA (acrylic acid) blocks and blocks branched with PEO are randomly constructed.

In the present invention, the first block may allow the lithium ions to move through it, thereby improving the charging/discharging performance of the battery, and may specifically comprise a polymer containing functional groups substitutable with lithium ions.

In that case, the polymer containing functional groups substitutable with lithium ions may include at least one selected from the group consisting of PAA (polyacrylic acid), PVS (poly(vinyl sulfonic acid)), PSS (poly(styrene sulfonate)) and PVH (poly(vinyl phosphonic acid)), and when considering an efficient aspect for improving the charging/discharging characteristics of the battery, the first block preferably includes PAA.

The functional group substitutable with lithium ion may be at least one selected from the group consisting of carboxylic acid, sulfonic acid, and phosphonic acid, and when considering substitution property by lithium ion, the functional group may be a carboxylic acid.

In addition, the first block may include a polymer in which functional groups are substituted with lithium ions. For example, the polymer in which functional groups are substituted with lithium ions may be PAA substituted with Li ions.

In the present invention, the second blocks also allow lithium ion to migrate and can impart flexibility to the electrode, and has a non-rigid, i.e., soft and loose property and thus can form a random copolymer well together with the first block, thereby preventing an agglomeration of the random copolymer.

The binder according to the present invention includes random copolymers formed from polyacrylic acid (PAA) and polyethylene oxide (PEO).

The weight-average molecular weight of the binder may be 5,000 to 4,000,000, preferably 100,000 to 4,000,000, more preferably 400,000 to 2,000,000. If the weight-average molecular weight of the binder is less than the above range, there is a problem that the adhesive force of the electrode is lowered or the elasticity is reduced and thus the electrode is easily warped. If the weight-average molecular weight of the binder exceeds the above range, there is a problem that the viscosity is so high that the slurry preparation process for forming the active layer of the electrode becomes impossible.

The random copolymer can be obtained by binding polymers different from each other, and means a copolymer formed by randomly linking two monomers. The random copolymer has an effect of maximizing the advantages and offsetting the disadvantages because the blocks having the respective functions are present in disorder. For example, in the case of a double or triple block copolymer, when the monomers having the electrochemical resistance component form a block and crowed together, the resistance may locally act to a large extent, thereby adversely affecting cell performance. On the contrary, if the monomers are disorderedly present in the form of random copolymer, it can offset its disadvantage. In addition, the double to triple block copolymer also generally undergo block-to-block phase separation, but the random copolymers in the form as in the present invention may be suitable for preparing slurry for electrode formation by preventing phase separation.

According to one embodiment of the present invention, since PAA and PEO are included in the form of random copolymer, it is possible to minimize the occurrence of phase separation, thereby preventing the agglomeration of the slurry for the preparation of the electrode and increasing the solid content of the slurry.

PAA and PEO are basically water soluble, but the main chain of PAA is composed of hydrophobic alkyl groups. Accordingly, in the case of PAA and PEO, it is difficult to directly mix PAA and PEO well, the slurry agglomeration due to the simple mixing is occurred severely, and the dispersion of the slurry becomes difficult.

In the present invention, the first block, for example, PAA, is capable of allowing lithium ion to move therethrough, and plays a role in suppressing the volume expansion during the charging/discharging by firmly holding the inside of the electrode. The weight of the first blocks, for example, PAA, included in the random copolymer may be 50 to 90 wt. %. If the weight of the first block is less than the above range, the second blocks, for example, PEO monomers, are relatively increased, thereby deteriorating the ability to firmly hold the inside of the electrode and thus deteriorating the cell performance. If the weight of the first block exceeds the above range, there is a problem that the flexibility of the electrode may be lowered.

In addition, the PAA may be one in which hydrogen ions are substituted with lithium ions, and the PAA substituted by lithium ions can be more advantageous in that it can improve the adhesive force of the electrode by increasing the viscosity of the slurry as compared with PAA, can suppress the generation of gas in the battery and can improve the life of the battery. The weight-average molecular weight of the PAA substituted by lithium ions may preferably be 400,000 to 2,000,000. If the weight-average molecular weight is less than the above range, there is a problem that the adhesive force of the electrode is lowered or the elasticity is reduced and the electrode is easily warped. If the weight-average molecular weight exceeds the above range, there is a problem that the viscosity is so high that the slurry process becomes impossible.

In the present invention, the second block, e.g., PEO, serves to impart flexibility to the electrode. The weight of the PEO contained in the random copolymer may be 10 to 50 wt. %. If the weight of the PEO is less than the above range, there is a problem that the effect of imparting flexibility to the electrode is insignificant. If the weight of the PEO exceeds the above range, there is a problem that the ability to firmly hold the inside of the electrode may be deteriorated due to Li-PAA.

Electrode

The present invention relates to an electrode comprising an electrode active layer comprising the binder including the random copolymer formed from polyacrylic acid (PAA) and polyethylene oxide (PEO), an electrode active material and an electrically conductive material.

In the present invention, the content of the binder in the active layer may be 3 to 10 wt. %. If the content of the binder is less than the above range, since the adhesive force between the materials constituting the active layer may be lowered and the durability of the electrode may be deteriorated, the performance of the battery may be poor. If the content of the binder exceeds the above range, the content of the electrode active material and the electrically conductive material may be relatively lowered, thereby lowering the charging/discharging characteristics and the life characteristics of the battery.

In the present invention, the content of the electrode active material in the active layer may be 60 to 95 wt. %. If the content of the electrode active material is less than the above range, the performance of the battery may be deteriorated. If the content of the electrode active material exceeds the above range, the charging/discharging characteristics of the battery may be deteriorated.

The content of the electrically conductive material in the active layer may be 2 to 10 wt. %. If the content of the electrically conductive material is less than the above range, the conductivity may be lowered. If the content of the electrically conductive material exceeds the above range, the content of the electrode active material may be relatively decreased and thus the charging/discharging characteristics and life characteristics of the battery may be deteriorated.

Specifically, in the present invention, the electrode may be a positive electrode or a negative electrode, the electrode active material may be a positive electrode active material or a negative electrode active material, and the electrode active layer may be a positive electrode active layer or a negative electrode active layer. Preferably, the electrode may be a positive or negative electrode of a lithium secondary battery, and the lithium secondary battery may be a lithium-sulfur battery.

The positive electrode may include a positive electrode active layer formed on a positive electrode current collector and the negative electrode may include a negative electrode active layer formed on a negative electrode current collector.

The positive electrode current collector is not particularly limited as long as it is generally used in the preparation of a positive electrode. According to one embodiment of the present invention, the positive electrode current collector may be at least one material selected from the group consisting of stainless steel, aluminum, nickel, titanium, sintered carbon and aluminum, and if necessary, the surface of the above-mentioned materials may be treated with carbon, nickel, titanium or silver. According to one embodiment of the present invention, the positive electrode current collector may be formed in various forms such as film, sheet, foil, net, porous body, foam or nonwoven fabric. The thickness of the positive electrode current collector is not particularly limited and may be set in a suitable range in consideration of the mechanical strength of the positive electrode, the productivity, and the capacity of the battery.

A method of forming the positive electrode active layer on the current collector may be a known coating method and is not particularly limited. For example, the coating method may be a bar coating method, a screen coating method, a doctor blade method, a dipping method, a reverse roll method, a direct roll method, a gravure method, or an extrusion method. The amount of the positive electrode active layer to be coated on the current collector is not particularly limited, and is adjusted in consideration of the thickness of the finally desired positive electrode active layer. Also, before or after the process of forming the positive electrode active layer, a known process required for the preparation of the positive electrode, for example, a rolling or drying process, can be performed.

The positive electrode active material included in the positive electrode active layer may be selected from elemental sulfur ($S_8$), a sulfur-based compound, or a mixture thereof which can be also used as the positive electrode active material of the lithium-sulfur battery, but is not limited thereto. Specifically, the sulfur-based compound may be $Li_2S_n$(n=1), an organic sulfur compound or a carbon-sulfur polymer (($C_2S_x)_n$: x=2.5 ~50, n≥2). They are applied in combination with electrically conductive material because sulfur is not electrically conductive by itself.

The electrically conductive material included in the positive electrode active layer may be graphite such as natural graphite or artificial graphite; carbon black such as carbon black, acetylene black, Ketjen black, channel black, furnace black, lamp black or thermal black; electrically conductive fibers such as carbon fiber or metal fiber; metal powder such as carbon fluoride, aluminum or nickel powder; electrically conductive whiskey such as zinc oxide or potassium titanate; electrically conductive metal oxides such as titanium oxide; or polyphenylene derivatives, but is not limited thereto.

The positive electrode active layer may further comprise other components, in addition to the positive electrode active material and the electrically conductive material. Additional components to the active layer may include cross-linking agents or dispersing agents for the electrically conductive materials. The cross-linking agent may be a cross-linking agent having two or more functional groups capable of reacting with the cross-linkable functional group of the acrylic polymer in order for the binder to form a cross-linking network. The cross-linking agent may be selected from, but not limited to, an isocyanate cross-linking agent, an epoxy cross-linking agent, an aziridine cross-linking agent, or a metal chelate cross-linking agent. According to one embodiment of the present invention, the cross-linking agent may preferably be the isocyanate cross-linking agent. The cross-linking agent may be added in an amount of 0.0001 to 1 part by weight based on 100 parts by weight of the total active layer.

The dispersing agent for the electrically conductive material helps disperse the non-polar carbon based electrically conductive material, thereby helping to make the paste. The dispersing agent for the electrically conductive material is not particularly limited, but may be selected from cellulose-based compounds including carboxymethyl cellulose (CMC), starch, hydroxypropyl cellulose, and regenerated cellulose. According to one embodiment of the present invention, the dispersing agent for the electrically conductive material may preferably be carboxymethyl cellulose (CMC). The dispersing agent for the conductive material may be added in an amount of 0.1 to 20 parts by weight based on 100 parts by weight of the total active layer.

A method of forming the positive electrode active layer on the current collector may be a known coating method and is not particularly limited. For example, the coating method may be a bar coating method, a screen coating method, a doctor blade method, a dipping method, a reverse roll method, a direct roll method, a gravure method, or an extrusion method. The amount of the positive electrode active layer to be coated on the current collector is not particularly limited, and is adjusted in consideration of the thickness of the finally desired positive electrode active layer. Also, before or after the process of forming the positive electrode active layer, a known process, for example, a rolling or drying process, required for the preparation of the positive electrode can be performed.

The negative electrode may include a negative electrode active layer formed on the negative electrode current collector and the negative electrode may include a negative electrode active layer formed on the negative electrode current collector.

Examples of the negative electrode active material may be a material capable of reversibly intercalating or deintercalating lithium ion ($Li^+$), a material capable of reacting with lithium ion to reversibly form a lithium-containing compound, lithium metal or a lithium alloy. The material capable of reversibly intercalating or deintercalating lithium ion ($Li^+$) may be, for example, crystalline carbon, amorphous carbon or mixtures thereof. The material capable of reacting with lithium ion to reversibly form a lithium-containing compound may be, for example, tin oxide, titanium nitrate or silicon. The lithium alloy may be, for example, an alloy of lithium (Li) and the metal selected from the group consisting of sodium (Na), potassium (K), rubidium (Rb), cesium (Cs), francium (Fr), beryllium (Be), magnesium (Mg), calcium (Ca), strontium (Sr), barium (Ba), radium (Ra), aluminum (Al), and tin (Sn).

The constitution of the binder, the current collector and the like, except for the negative electrode active material, can be performed by the materials and methods used in the above-mentioned positive electrode.

Lithium-Sulfur Battery

The present invention provides a lithium-sulfur battery having improved life characteristics by adding the above-described electrode, a separator and an electrolyte solution.

The lithium-sulfur battery according to the present invention may include the positive electrode or the negative electrode as described above.

In the lithium-sulfur battery of the present invention, the electrolyte solution is not particularly limited as long as it is a non-aqueous solvent serving as a medium through which ions involved in the electrochemical reaction of the battery can move. According to one embodiment of the present invention, the solvent may be a carbonate-based solvent, an ester-based solvent, an ether-based solvent, a ketone-based solvent, an alcohol-based solvent, or an aprotic solvent. Examples of the carbonate-based solvent may specifically include dimethyl carbonate (DMC), diethyl carbonate (DEC), dipropyl carbonate (DPC), methyl propyl carbonate (MPC), ethyl propyl carbonate (EPC), methyl ethyl carbonate (MEC), ethylene carbonate (EC), propylene carbonate (PC), or butylene carbonate (BC), etc. Examples of the ester-based solvent may specifically include methyl acetate, ethyl acetate, n-propyl acetate, 1,1-dimethyl ethyl acetate, methyl propionate, ethyl propionate, γ-butyrolactone, decanolide, valerolactone, and mevalonolactone, carprolactone, etc. Examples of the ether-based solvent may specifically include diethyl ether, dipropyl ether, dibutyl ether, dimethoxymethane, trimethoxymethane, dimethoxyethane, diethoxyethane, diglyme, triglyme, tetraglyme, tetrahydrofuran, 2-methyltetrahydrofuran, or polyethylene glycol dimethyl ether, etc. Examples of the ketone-based solvent may specifically include cyclohexanone, etc. Examples of the alcohol-based solvent may specifically include ethylalcohol, or isopropylalcohol, etc. Examples of the aprotic solvent may specifically include nitriles such as acetonitrile, amides such as dimethylformamide, dioxolanes such as 1,3-dioxolane (DOL), or sulfolane, etc. The non-aqueous organic solvents may be used alone or in combination of one or more. The mixing ratio when using in combination of one or more can be appropriately adjusted depending on the desired performance of the battery. In particular, a mixed solution of 1:1 volume ratio of 1,3-dioxolane and dimethoxyethane may be preferable.

In the lithium-sulfur battery according to the present invention, the separator is a physical separator having a function of physically separating electrodes. The separator can be used without special restrictions, as long as it is used as a conventional separator. Particularly, a separator with excellent electrolyte solution humidification ability while exhibiting low resistance to ion migration of electrolyte solution is preferable.

In addition, the separator enables the lithium ion to be transported between the positive electrode and the negative electrode while separating or insulating the positive electrode and the negative electrode from each other. Such separator may be made of a porous, nonconductive or insulating material having a porosity of 30 to 50%.

Specifically, a porous polymer film, for example, a porous polymer film made of a polyolefin-based polymer such as ethylene homopolymer, propylene homopolymer, ethylene/butene copolymer, ethylene/hexene copolymer and ethylene/methacrylate copolymer, etc. may be used, and a nonwoven fabric made of glass fiber having high melting point or the like can be used. Among them, the porous polymer film is preferably used.

If the polymer film is used for both the buffer layer and the separator, the impregnation amount and ion conduction characteristics of the electrolyte solution are decreased and the effect of reducing the overvoltage and improving the capacity characteristics becomes insignificant. On the contrary, if the nonwoven fabric material is used for both the buffer layer and the separator, a mechanical stiffness cannot be ensured and thus a problem of short circuit of the battery occurs. However, if a film-type separator and a polymer nonwoven fabric buffer layer are used together, the mechanical strength can also be ensured together with the improvement effect of the battery performance due to the adoption of the buffer layer.

According to one preferred embodiment of the present invention, the ethylene homopolymer (polyethylene) polymer film is used as a separator, and the polyimide nonwoven fabric is used as a buffer layer. In that case, the polyethylene polymer film preferably has a thickness of 10 to 25 μm and a porosity of 40 to 50%.

Hereinafter, examples of the present invention will be described in order to facilitate understanding of the present invention. However, the following examples are provided to facilitate understanding of the present invention, but the present invention is not limited thereto.

Example 1: Preparation of Binder (PAA-r-PEO) and Lithium-Sulfur Battery (1) Preparation of Binder Two kinds of monomers (acrylic acid, mono-methyl polyethylene glycol acrylate) were added to distilled water at a weight ratio of 80:20, an initiator (VA057) was added, and the mixture was stirred at 60° C. for 20 hours. The mixture was washed with alcohol and dimethyl ether, and then dried at room temperature and vacuum for 24 hours to prepare a binder (PAA-r-PEO) which is a random copolymer of PAA and PEO.

(2) Preparation of Positive Electrode

A mixture of carbon powder and sulfur in a weight ratio of 30:70 was subjected to a wet ball milling process to obtain a carbon and sulfur composite. A positive electrode slurry was prepared by adding a positive electrode mixture (85 wt. % of the carbon and sulfur composite, 5 wt. % of VGCF (Vapor Grown Carbon Fiber, electrically conductive material), 10 wt. % of the binder) to water as a solvent. The obtained positive electrode slurry was coated on an aluminum current collector and dried at 50° C. for 12 hours to produce a positive electrode with a sulfur loading of 5.5 mAh/cm$^2$.

(3) Preparation of Lithium-Sulfur Battery

For the construction of the lithium-sulfur battery, the above-mentioned positive electrode, lithium foil having a thickness of 40 μm as a negative electrode, and polyolefin membrane as a separator were used. Also, the manufacture of the battery was completed using an electrolyte solution in which 0.38 M LiN(CF$_3$SO$_2$)$_2$ and 0.31 M LiNO$_3$ were dissolved in a mixed solution of 1,3-dioxolane and dimethoxyethane.

Example 2: Preparation of Binder (PAA-r-PEO Substituted by Li) and Lithium-Sulfur Battery A binder composed of random copolymer containing PAA and PEO substituted with Li ion, a positive electrode and a lithium-sulfur battery was prepared in the same manner as in Example 1, except that an aqueous solution of LiOH was added during polymerization.

Comparative Example 1: Preparation of Binder (Including Mixture of PAA and PEO) and Lithium-Sulfur Battery In the case of a PAA and PEO blended binder, commercially available PAA (average molecular weight: 4,000,000) and PEO (average molecular weight: 4,000,000) were mixed to prepare a binder.

A positive electrode and a lithium-sulfur battery were prepared in the same manner as in Example 1 using the PAA and PEO blended binder.

Experimental Example 1: Observation of Surface of Electrode

The surfaces of the positive electrodes, each prepared in Examples 1 and 2 and Comparative Example 1, were observed.

FIG. 1 is an optical microscope photograph of the surfaces of the positive electrodes prepared in Examples 1 and 2 and Comparative Example 1, respectively.

Referring to FIG. 1, no agglomeration or crack was observed on the surface of the electrode prepared in Example 2, but some cracks were observed in Example 1. In the case of Comparative Example 1, the cracks did not conspicuously occur, but the surface was very rugged, which was due to the agglomeration of the binder. In the case of Example 1, the reason of the cracks is due to the fact that the molecular weight is relatively low, and if adjusting the molecular weight to be equal to that of Example 2, it is considered that some cracks will be eliminated, and in addition, lithium substitution is considered to have greatly contributed to the improvement of cracks.

Also, the slurries of Examples 1 and 2 did not show the agglomeration even when visually observing the slurries during the preparing process, but some agglomeration was observed in the slurry of Comparative Example 1.

Experimental Example 2: Measurement of Molecular Weight of Binder

The weight-average molecular weights of the binders prepared in Examples 1 and 2 and Comparative Example 1 were measured. The weight-average molecular weight (Mw)

and the molecular weight distribution (PDI) were measured using GPC (Gel Permeation Chromatography) under the following measuring conditions, and the measurement results were converted using the standard polyethylene glycol of the Agilent system for the calibration curve.

<Measurement Condition>

Measurement device: Agilent GPC (Agilent 1200 series, U.S.)

Column: Polar gel

Column temperature: 35° C.

Eluent: Water (buffer solution of pH 7)

Flow rate: 1.0 mL/min

Concentration: ~1 mg/mL (100 μL injection)

Table 1 below shows the weight-average molecular weights of the binders prepared in Examples 1 and 2 and Comparative Example 1, respectively.

TABLE 1

| | Weight-average molecular weight of binder |
|---|---|
| Example 1 | 150,000 |
| Example 2 | 700,000 |
| Comparative Example 1 | Prepared by adding PAA and PEO with weight-average molecular weight of 4,000,000 respectively |

Referring to Table 1, it can be seen that the binders in Examples 1 and 2 have a smaller weight-average molecular weight than the binder in Comparative Example 1.

In particular, it can be seen that the molecular weight of the binder in Example 2 is about 5 times the molecular weight in the case of Example 1.

Experimental Example 3: Measurement of Solid Content of Slurry

The solid contents were calculated from the amounts of solids and water used in the preparation of the slurries prepared to produce positive electrodes, respectively, in Examples 1 and 2 and Comparative Example 1.

Table 2 below shows the solid content (%) of the slurries prepared to produce positive electrodes in Examples 1 and 2 and Comparative Example 1, respectively, and the solid content in the slurry represents the weight of the solid in the whole slurry as a percentage.

TABLE 2

| | Solid content (%) of slurry |
|---|---|
| Example 1 | 27.5 |
| Example 2 | 27.2 |
| Comparative Example 1 | 12.9 |

Referring to Table 2, it can be seen that the random copolymer forms in Examples 1 and 2 are higher in the solid content of the slurry than the simple mixing form in Comparative Example 2. Also, it can be seen that the lithium-substituted binder in Example 2 will have a slightly increased viscosity of the slurry compared to the binder in Example 1.

Experimental Example 4: Measurement of Physical Properties of Electrode

For the positive electrodes of the lithium-sulfur batteries which were prepared in Examples 1 and 2 and Comparative Example 1, respectively, the surface roughness of the electrode and the adhesive force of the electrode were measured.

The surface roughness (Sa, μm) of the electrodes was measured using a VK-X100K/200K instrument from KEYENC, and the results are shown in Table 3 below. The Sa value represents the average absolute value of the height difference between points with respect to the average surface, which means that the higher the value, the higher the surface roughness.

TABLE 3

| | Roughness (Sa, μm) |
|---|---|
| Example 1 | 3.7 |
| Example 2 | 3.6 |
| Comparative Example 1 | 5.3 |

Referring to Table 3, it can be seen that the surface of the electrode in Comparative Example 1 is rougher than those of Examples 1 and 2.

The adhesive force of the electrode was measured by a 90° peel test method, and the results are shown in Table 4 below.

TABLE 4

| | Adhesive force (gf/cm) |
|---|---|
| Example 1 | 2.2 |
| Example 2 | 8.9 |
| Comparative Example 1 | 1~2 |

Referring to Table 4 above, it can be seen that the adhesive force of Example 2 was the best. The reason why the adhesive force of the binder in Example 2 is higher than the binder in Example 1 can be deduced due to the fact that the molecular weight of the binder in Example 2 is relatively high, and the viscosity of the binder is increased by substituting with lithium, and these results simultaneously brought about a positive effect.

Experimental Example 5: Experiment of Cycle Characteristics

The lithium-sulfur batteries in Examples 1 and 2 and Comparative Example 1 were subjected to charging/discharging in the following manner.

<Evaluation Method of Charging/Discharging Characteristics>

Cycle temperature: 25° C.

C-rate: 0.1 C (2.5 times)→+0.2 C (3 times)→0.3 C charging/0.5 C discharging (constant current mode)

V cut-off: 1.8-2.5 V

FIG. 2 is a graph showing the results of the charging/discharging test for the lithium-sulfur batteries manufactured using the binders of Examples 1 and 2 and Comparative Example 1, respectively.

Referring to FIG. 2, there is no significant difference in cell performance between Examples 1 and 2 and Comparative Example 1. However, as shown in Experimental Examples 1 to 4, there is a great advantage in the electrode preparing process.

Although the present invention has been described with reference to exemplary embodiments and drawings, it is to be understood that the present invention is not limited thereto and also that various modifications and variations can be made within the spirit of the present invention and within the range equivalent to the scope of the claims to be described below, by a person having ordinary skill in the art to which the invention belongs.

The invention claimed is:

1. An electrode comprising:
   (i) an electrically conductive material;
   (ii) an electrode active material; and
   (iii) a binder;
   wherein the binder comprises a random copolymer including a first block and a second block,
   wherein the first block comprises a polymer selected from the group consisting of PAA (polyacrylic acid);
   wherein the first block consists of the polymer in which functional groups are substituted by lithium ions;
   wherein the second block is mono-methyl polyethylene glycol acrylate;
   wherein the random copolymer comprises 50 wt.% to 90 wt.% of the first block and 10 wt.% to 50 wt.% of the second block;
   wherein the binder has a weight-average molecular weight of 700,000, and
   wherein the first block and second block are in a weight ratio of 80:20.

2. The electrode according to claim 1, wherein an active layer comprises 0.1 to 10 wt.% of the binder, 30 to 95 wt.% of the electrode active material and 2 to 60 wt.% of the electrically conductive material.

3. A lithium secondary battery comprising the electrode of claim 1.

4. The lithium secondary battery according to claim 3, wherein the electrode is a positive electrode.

* * * * *